US008019583B1

(12) United States Patent
Sturrock et al.

(10) Patent No.: US 8,019,583 B1
(45) Date of Patent: Sep. 13, 2011

(54) SELECTIVE FUNCTIONAL GROUP SIMULATION OF AUTOMATION CONTROL AND INFORMATION SYSTEMS

(75) Inventors: David T. Sturrock, Evans City, PA (US); Genevieve O'Neill Kolt, Concord, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 937 days.

(21) Appl. No.: 11/422,936

(22) Filed: Jun. 8, 2006

(51) Int. Cl.
*G06F 17/50* (2006.01)
(52) U.S. Cl. .......................................... 703/13
(58) Field of Classification Search .............. 703/13; 700/19, 20
See application file for complete search history.

(56) References Cited

U.S. PATENT DOCUMENTS

| | | | | |
|---|---|---|---|---|
| 2004/0062278 | A1* | 4/2004 | Hadzic et al. | 370/503 |
| 2005/0171746 | A1* | 8/2005 | Thalhammer-Reyero | 703/2 |
| 2006/0074499 | A1* | 4/2006 | Hamidpour | 700/19 |
| 2007/0192079 | A1* | 8/2007 | Rompaey et al. | 703/19 |
| 2007/0238199 | A1* | 10/2007 | Yamashita | 438/5 |

OTHER PUBLICATIONS

Cheung et al. (Synchronizing simulation in distributed interactive simulation, 1994).*
Wenlong Zhao, et al. A Framework for Configurable Hierarchical Simulation in a Multiple-User Decision Support Environment. Proceedings of the Winter Simulation Conference, Dec. 4, 2005, Piscataway, NJ, USA. IEEE, Dec. 4, 2005, pp. 327-335, XP010880523, ISBN 0-7803-9519-0. Last accessed Jan. 18, 2008.
European Search Report for European Patent Application No. EP07011254 dated Nov. 19, 2007, 2 pages.
Office Action mailed Apr. 14, 2010 for Chinese Patent Application No. 200710138828.3, 5 pages.
Office Action mailed Mar. 20, 2009 for Chinese Patent Application No. 200710138828.3, 5 pages.
Office Action mailed Sep. 3, 2009 for European Patent Application No. 07011254.5, 3 pages.

* cited by examiner

*Primary Examiner* — Jason Proctor
*Assistant Examiner* — Andre Pierre Louis
(74) *Attorney, Agent, or Firm* — Turocy & Watson LLP; Alexander R. Kuszewski; John M. Miller

(57) ABSTRACT

A simulation model can individually and selectively simulate sub-processes of a full-scale production system. Such a customized simulator can directly simulate all the processes of a system, any combination of processes of a system, or a single process of a system. The remaining processes of the system are left to be executed by an operator or equivalent software program. The model and corresponding information can be used for test, design, evaluation, adjustment, certification, and training purposes.

23 Claims, 12 Drawing Sheets

SELECTIVE FUNCTIONAL GROUP SIMULATION OF AUTOMATION CONTROL AND INFORMATION SYSTEMS

TECHNICAL FIELD

The subject invention relates generally to simulation, and more particularly to an individualized model of selective group simulation.

BACKGROUND

Organizations invest substantial amounts of money, time, and resources in preparation of a new project before the actual product line is marketed to the public, let alone released. Companies can build working prototypes to assist in the planning process. However, such prototypes are not sufficient for today's complex needs. First, prototypes are time-consuming and expensive to build. Second, prototypes often cannot accurately portray the details of systems that are too large, too small, and too complex. Third, while prototypes may model the production of a single product, such a prototype does not fully realize the effects and challenges of a full-scale production system.

Instead, organizations may rely on simulations to mimic the behavior of a new project as it would perform in the real world. A simulation is a model executed entirely in software that communicates information regarding how a product should behave. This information is then used to evaluate and implement alternatives to the system. For example, a new peanut butter manufacturing plant can use simulation to optimize the speed settings of particular ingredients and maximize batch throughput without suffering the consequence of wasted trial runs. Reliable simulation techniques that produce accurate results are essential to the operational planning of many businesses.

Commissioning time refers to the period beginning when a new system is delivered and ending when it is running at full capacity. During this time period, system debugging and personnel training is an essential part of every project and may cause significant concerns relating to costs associated with this delay. Simulation can shorten the commissioning time by shifting the testing and training phases to an earlier point in the project timeframe.

In addition, simulations can assist in decisions regarding whether or not certain modifications to existing programs should be implemented. A simulation can estimate the results of hypothetical changes to a system. These results can be analyzed to determine which adjustments are worthwhile. For instance, an assembly line simulator can rearrange the order of the line to find the most efficient result. Businesses depend on simulations to continuously and seamlessly improve their procedures and processes.

Furthermore, simulations can also be an effective training and certification mechanism. In the same way that a novice airplane pilot would not initially fly an actual airplane, a factory operator also should not immediately run a machine. A new user can learn and perfect his skills on a simulation program before interacting with the actual machine, product, or program. Therefore, mistakes affecting real operation are minimized through practice on a simulation device. Training in accelerated time and with non-routine event scenarios can also be facilitated with simulation. Due to safety and cost considerations, businesses desire an accurate simulation technique for training sessions.

A highly flexible simulation allows organizations to customize in detail the parameters specific to their needs. They rely on the simulation itself in conjunction with its results for strategic planning, testing, and training. Fields in various areas, such as banking, manufacturing, supply chain analysis, health care, airport security, and the military, can benefit from simulation analysis. Regardless of the specific purpose of the simulation, one that closely mimics the relevant internal and external functions of the entire system is most useful.

SUMMARY

The following presents a simplified summary of the claimed subject matter in order to provide a basic understanding of some aspects described herein. This summary is not an extensive overview and is not intended to identify key/critical elements or to delineate the scope of the claimed subject matter. Its sole purpose is to present some concepts of the claimed subject matter in a simplified form as a prelude to the more detailed description that is presented later.

A production system includes various sub-processes that connect and collaborate with each other in a unified manner. While the particular components that contribute to a system may vary, an example of a system is composed of three general areas: high level control, device control logic, and a physical system. More specifically, a system may include sub-processes for order generation, planning/dispatching, logic/controller, interface devices (e.g., human-machine interfaces, graphical user interfaces, user interfaces, and operator interfaces), communications, data logging, and the physical system.

If the entire system needed to be run for monitoring and evaluation purposes, a simulator would cohesively execute the entire system. However, when just a portion of the system is to be tested for reconfiguration, those processes to be tested are executed by an operator or trainee and a simulator runs the remaining processes. Selective simulation can be applied to uses such as unit testing process controller logic, comprehensive control system testing, high level software testing, operator interface design, and operator training.

Emulation can act as a substitution or addition to a simulation process. Emulation features include fully controlled clock progression (e.g., changing the speed or pausing the clock) and capabilities to map the design on custom programmable devices, such as field programmable gate arrays.

Although the processes of a system are interconnected in some way, the simulator described herein can flexibly select just a single process or any combination of processes to individually simulate. Operators that drive the remaining processes provide the simulation model with adjustable parameters. Through this process, the executed (non-simulated) portions are tested to see how they are programmed and how well they behave.

A simulator can run an entire system to view an assembly line process. For example, the simulator could model an entire assembly process to identify potential problems and bottlenecks. One could evaluate those issues and adjust the process accordingly, then rerun the adjusted simulator to observe the resulting improvement in the model. This comprehensive simulation can be implemented for new or existing projects.

In the alternative, a simulator can execute select portions of the system. This enables isolated and accurate testing of any particular part of the system. Simulation enables one to verify that the logic and I/O in controller code exhibit proper behavior. Simulation also enables one to validate that the system controllers work together to adequately address a wide range of situations that might occur in a real environment. Furthermore, simulation allows one to test the high level software response of various complex scenarios in the system. For instance, selective simulation could be used to verify that a heater is properly programmed to turn on and off at the necessary intervals of time. Such illustration demonstrates the relationship between a controller and a heater. For testing purposes, the controller that ultimately will be connected to a heater is instead connected to a simulator that acts in place of the heater. An operator can use this model to confirm that the heater controller accurately functions in a variety of simulated scenarios in response to corresponding set points, commands, and situations.

In addition, a simulator is a tool that can assist an engineer to design a convenient user interface without waiting for completion of the actual system. Engineers can observe and collect suggestions from operators who evaluate the convenience of a visual and functional configuration.

A simulator can also execute the appropriate portions of the system for training purposes. For instance, when a simulator is used as a training device, the operational and reactive aspects of the system are simulated, while the trainee drives the high level controlled aspects of the system. In this event, the trainee continuously interacts with the simulator in a way that is similar to the actual environment.

To the accomplishment of the foregoing and related ends, certain illustrative aspects are described herein in connection with the following description and the annexed drawings. These aspects are indicative, however, of but a few of the various ways in which the principles of the claimed subject matter may be employed, and such subject matter is intended to include all such aspects and their equivalents. Other advantages and novel features may become apparent from the following detailed description when considered in conjunction with the drawings.

DETAILED DESCRIPTION

Figure 1:
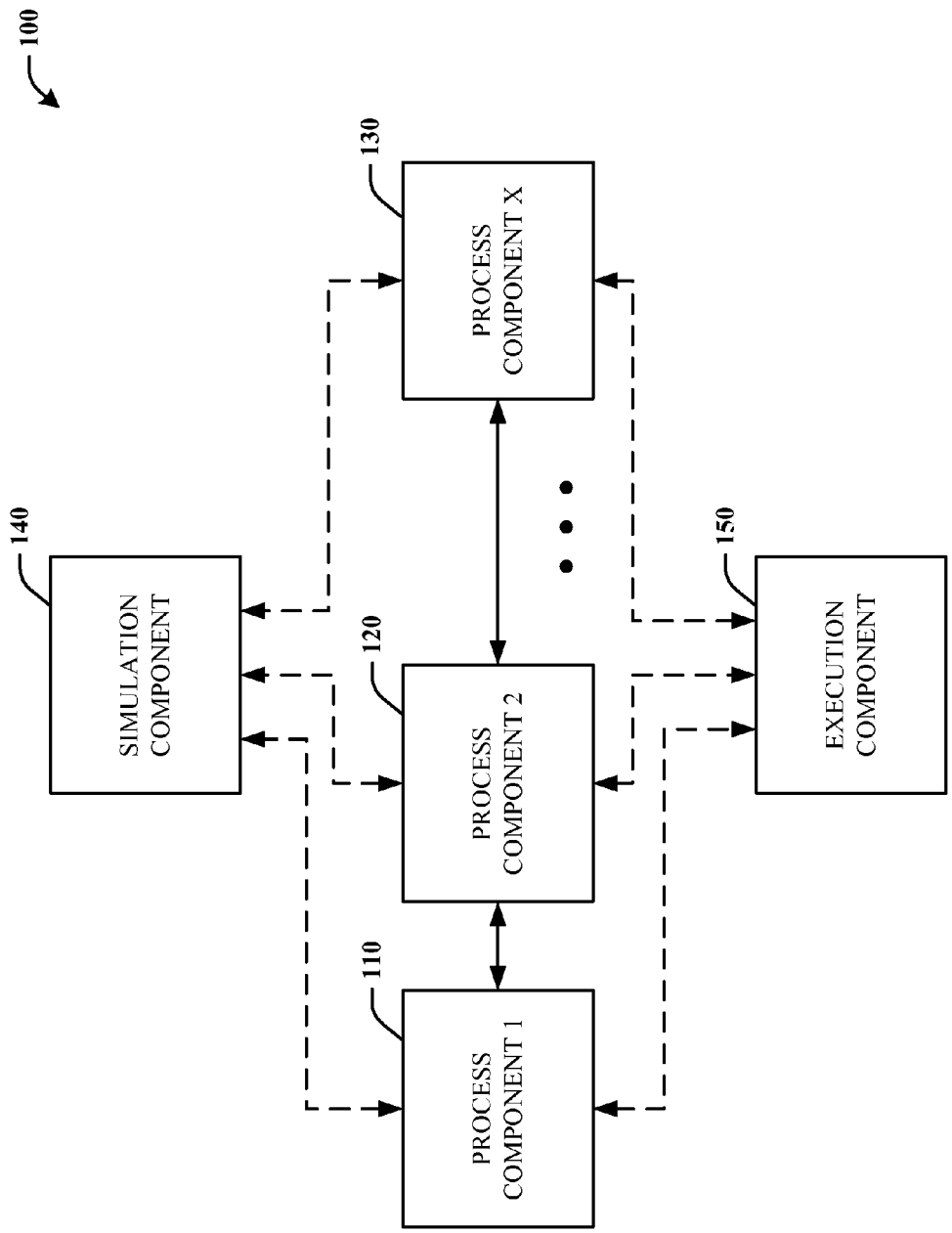
FIG. 1 is a block diagram of a simulation system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

In FIG. 1, a block diagram of a simulation system 100 is shown. The simulation system 100 comprises a simulation component 140 and an execution component 150 that individually and selectively drives a first process component 110, a second process component 120, and up to an Xth process component 130. Each process component is executed by either the simulation component 140 or the execution component 150. The process components communicate with each other on a normal basis to comprise a working system to be modeled.

Depending on the goal of the system, the process components 110-130 can divide the system into any number of broad or narrow designations. This enables the modeling process to be customized for a particular use, since important aspects can be narrowly defined and less important aspects can be broadly defined.

The simulation component 140 individually and selectively controls each process component. A user may decide to simulate all the process components, some of the process components, or a just a single process component. For example, a user may choose to simulate the first process component 110 and the second process component 120, but not the remaining process components. The user may select any quantity or combination of process components for simulation.

After the simulation component 140 has established which process components it should simulate, the remaining process components, if any, are driven by a user-directed execution component 150. The execution component 150 allows an operator to interact with the appropriate process components by adding a variable to monitor responses of the simulation system 100. For instance, a food processing plant that generates peanut butter can be modeled as a system defined by an ordering process, mixing process, and delivery process. The plant can test a planning and dispatching model by adding peanut butter to a certain tank to see how it affects other factors in the system. Furthermore, a separate simulation covering order generation allows a user to specify, for example, a typical daily output of ten batches of regular peanut butter and 8 batches of low fat peanut butter. This allows the user to define details as if he was driving the actual plant. The simulation component 140 also takes into account regular occurrences, such as equipment downtime, late deliveries, and early deliveries.

Figure 2:
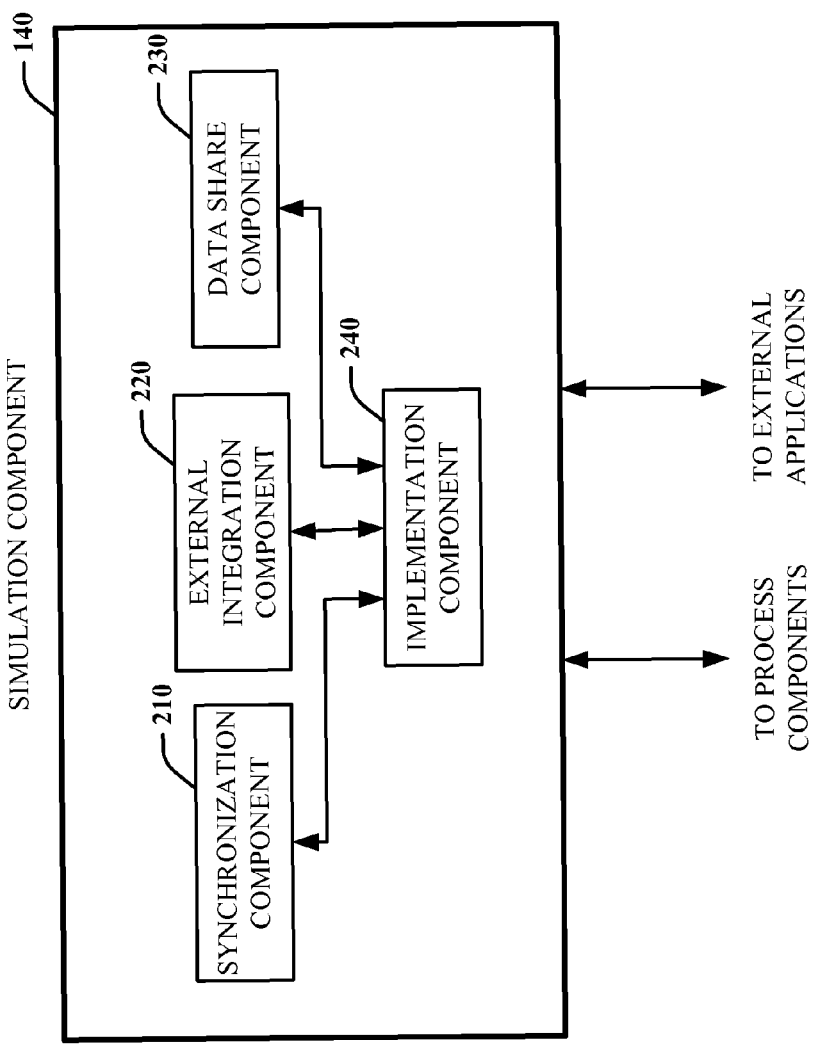
FIG. 2 is a block diagram of a simulation component.

Referring to FIG. 2, a block diagram of a simulation component 140 is illustrated. The simulation component 140 comprises a synchronization component 210, an external integration component 220, a data share component 230, and an implementation component 240. The simulation component 140 individually communicates with one or more process components to model the proper parts of the system and also with one or more external applications to receive and send data relevant to the simulation model.

The simulation component 140 can be customized for the needs of a specific system. The synchronization component 210 enables the clock of the simulation component 140 to be synchronized with a computer clock, or another external timekeeper. This allows the simulation component 140 to speed up or slow down the process timing to any suitable multiple (or fraction thereof). In one example, the simulation component 140 can slow simulation to half speed to train novice operators. In another example, the simulation component 140 can speed up simulation to compress the testing time and reach an output result in a shorter amount of time.

The external integration component 220 allows a user to integrate external behavior into the logic of the simulation component 140. The communication can be established manually or automatically and can take into account, for instance, messages regarding action requests and status changes. The data share component 230 provides the simulation component 140 with a convenient mechanism to share data extracted from the simulation model at any point in time with other applications. Therefore, a user can upload data from the simulation component 140 to an external evaluation application for data analysis. The external application can also automatically request or extract the data from the simulation component 140. The information should be presented in a mutually readable format, so that translation is not required between the simulation component 140 and the external application.

After the synchronization component 210, external integration component 220, and data share component 230 complete their respective configurations, the implementation component 240 integrates those parameters into the simulation model. These parameters can be saved and labeled for future use.

Figure 3:
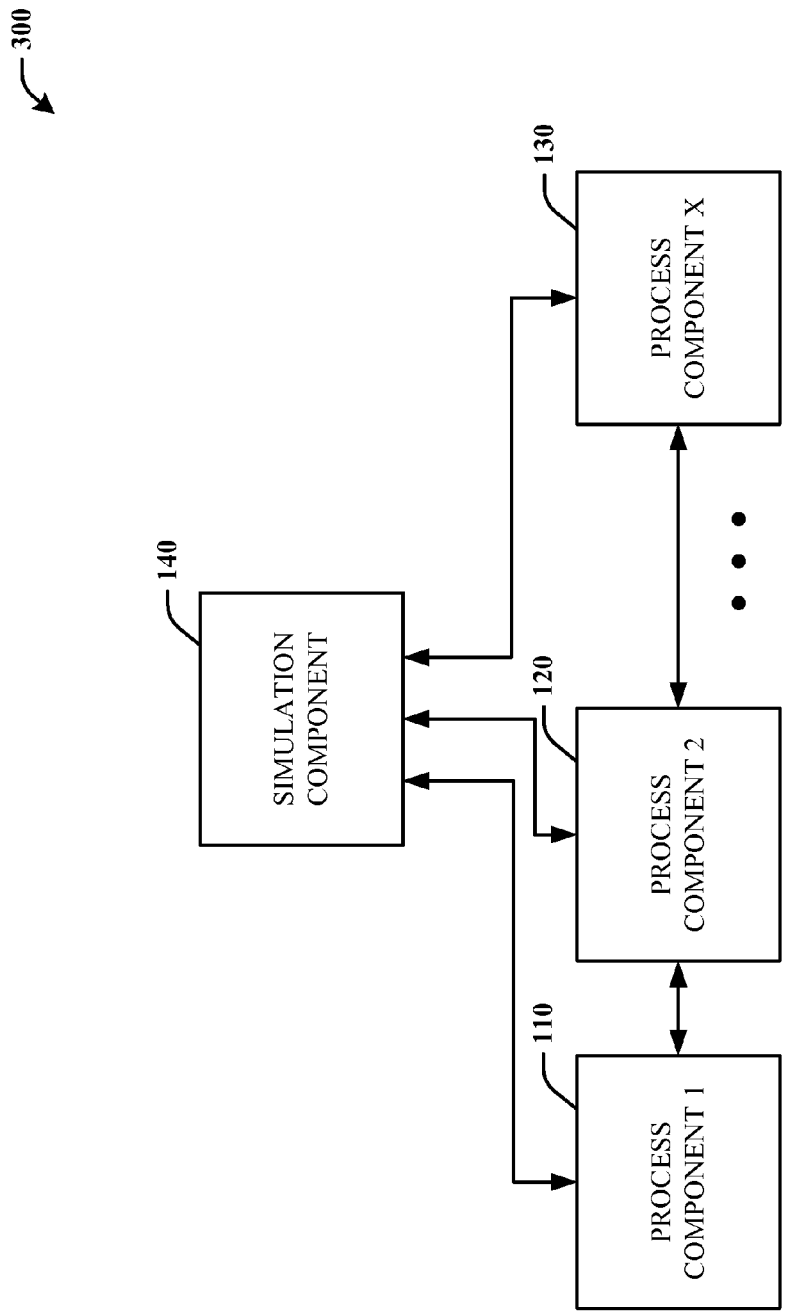
FIG. 3 is a block diagram of a simulation system for complete monitoring and evaluation.

Now referring to FIG. 3, a block diagram of a simulation system 300 for complete monitoring and evaluation is depicted. In this example system 300, the simulation component 140 provides a full system model by executing all the process components, from first process component 110, second process component 120, through an Xth process component 130.

Such a configuration encompasses all components into a single simulation model and enables a user to passively monitor the execution of the system. This model offers various benefits, including the ability to analyze expected throughput, identify problems, and locate bottlenecks. A user may opt for this approach to initially design and test a new procedure, such as the manufacturing of a new device. In addition, a user may favor this approach for an existing procedure of a current device to identify possible areas of improvement. Depending on the intent of this model, the simulation can be executed in normal time, delayed time, expedited time, and the parameters and results can be documented for future use.

Figure 4:
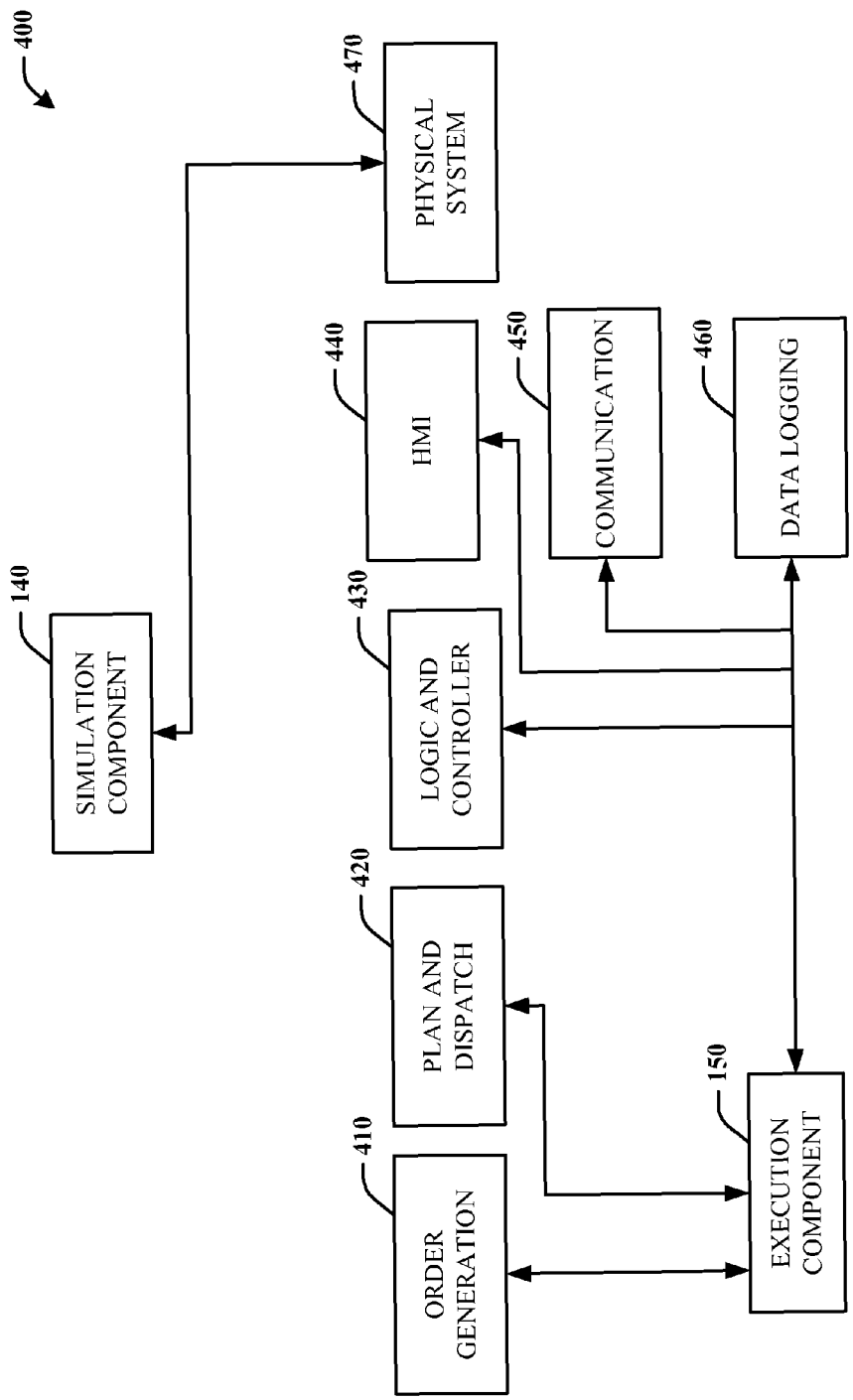
FIG. 4 is a block diagram of a simulation system for operator training.

FIG. 4 illustrates a block diagram of a simulation system 400 that facilitates operator training. Integrating simulation into operator training avoids the risks and impacts of training on the actual system. The training module can be configured to represent varying degrees of reality. Different components can be selected for simulation for convenience, practicality, or preference; and those components may be simulated to an appropriate degree of detail. For instance, actual hardware components can be difficult to obtain, so simulation is a practical solution to model those aspects.

For this illustration, while the system 400 is modeled by the listed categorical processes, any particular group of processes is generally dependent on the preferences of a specific business, organization, product, or project. In this example, the simulation component 140 executes the physical system 470. The execution component 150 executes the remaining processes 410-460 of the system 400. Such configuration corresponds closely to a training scenario of a real airplane, without actually flying it.

Figure 5:
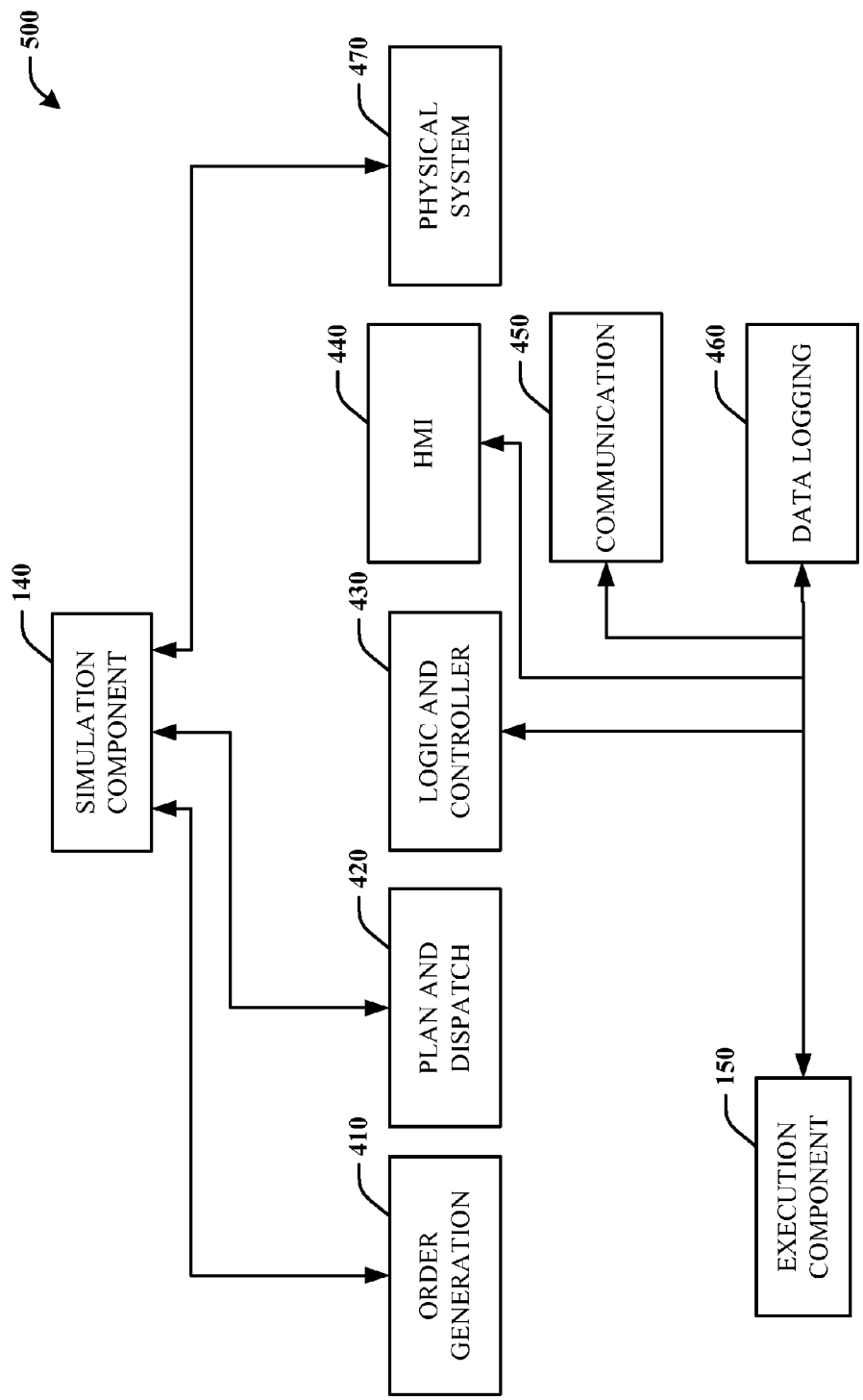
FIG. 5 is a another block diagram of a simulation system for operator training.

As shown in FIG. 5, another block diagram of a simulation system 500 for operator training is depicted. The simulation component 140 represents the physical system 470, the order generation 410, and the plan and dispatch 420, and the operator interacts with the execution component 150 to execute the remaining processes 430-460.

Through this training configuration, the simulation component 140 not only represents the physical system 470 (e.g., an airplane), but also the order generation 410 (e.g., weather conditions) and the plan and dispatch 420 (e.g., surrounding air traffic). The simulation component 140 can represent the order generation 410 to a low degree of detail by omitting specific aspects that are unnecessary for the particular training exercise.

Figure 6:
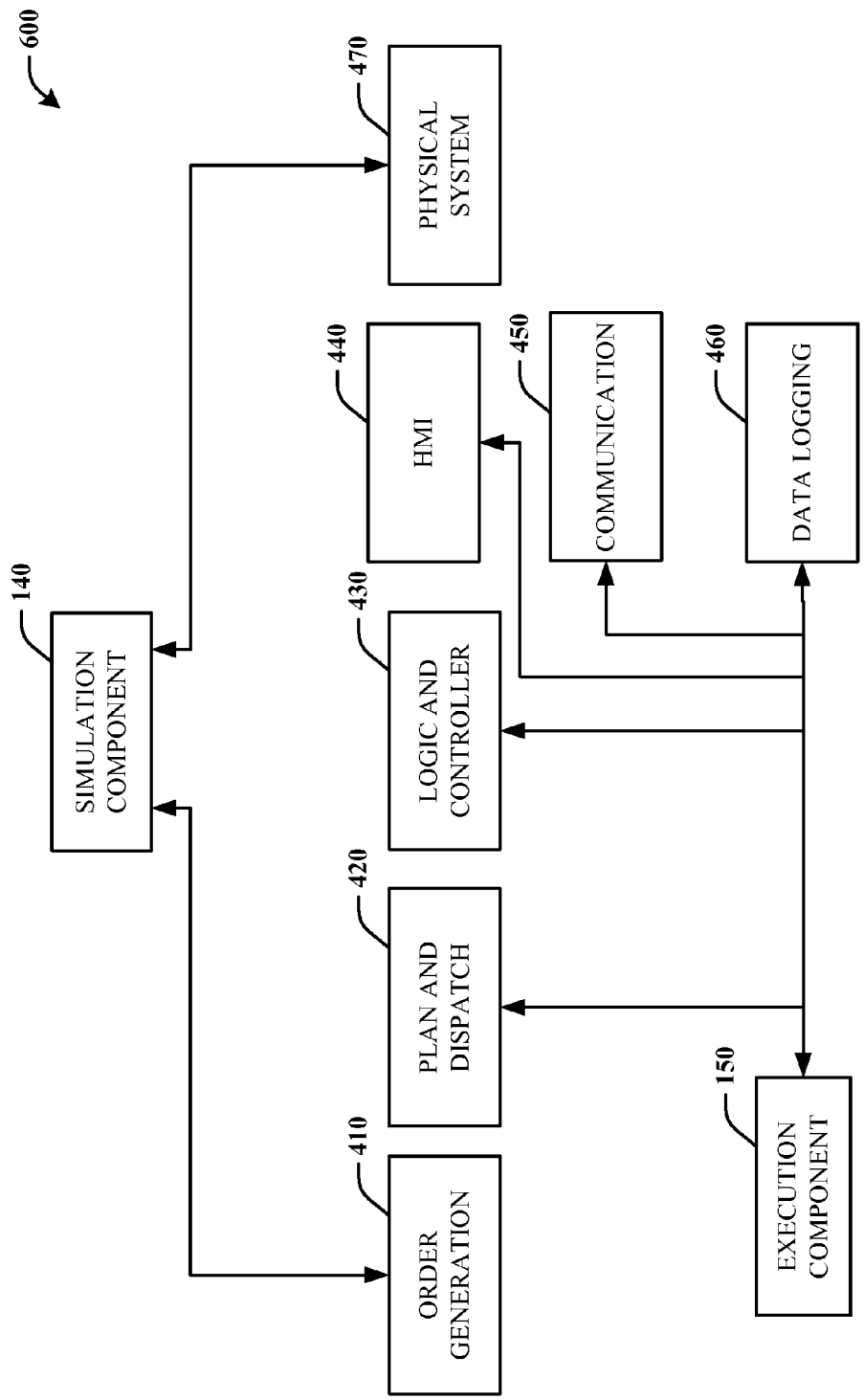
FIG. 6 is a block diagram of a simulation system for testing.

FIG. 6 depicts a block diagram of a simulation system 600 for testing. In this example, the simulation component 140 represents the processes relating to order generation 410 and a physical system 470. The execution component 150 executes the processes relating to a plan/dispatch 420, a logic/controller 430, a Human Machine Interface 440, communication 450, and data logging 460. Some advantages that emerge from this simulation setup are the verification of I/O and logic and the ability to examine events without impacting the real system, which in turn decreases the cost of factory acceptance tests and reduces commissioning time.

Figure 7:
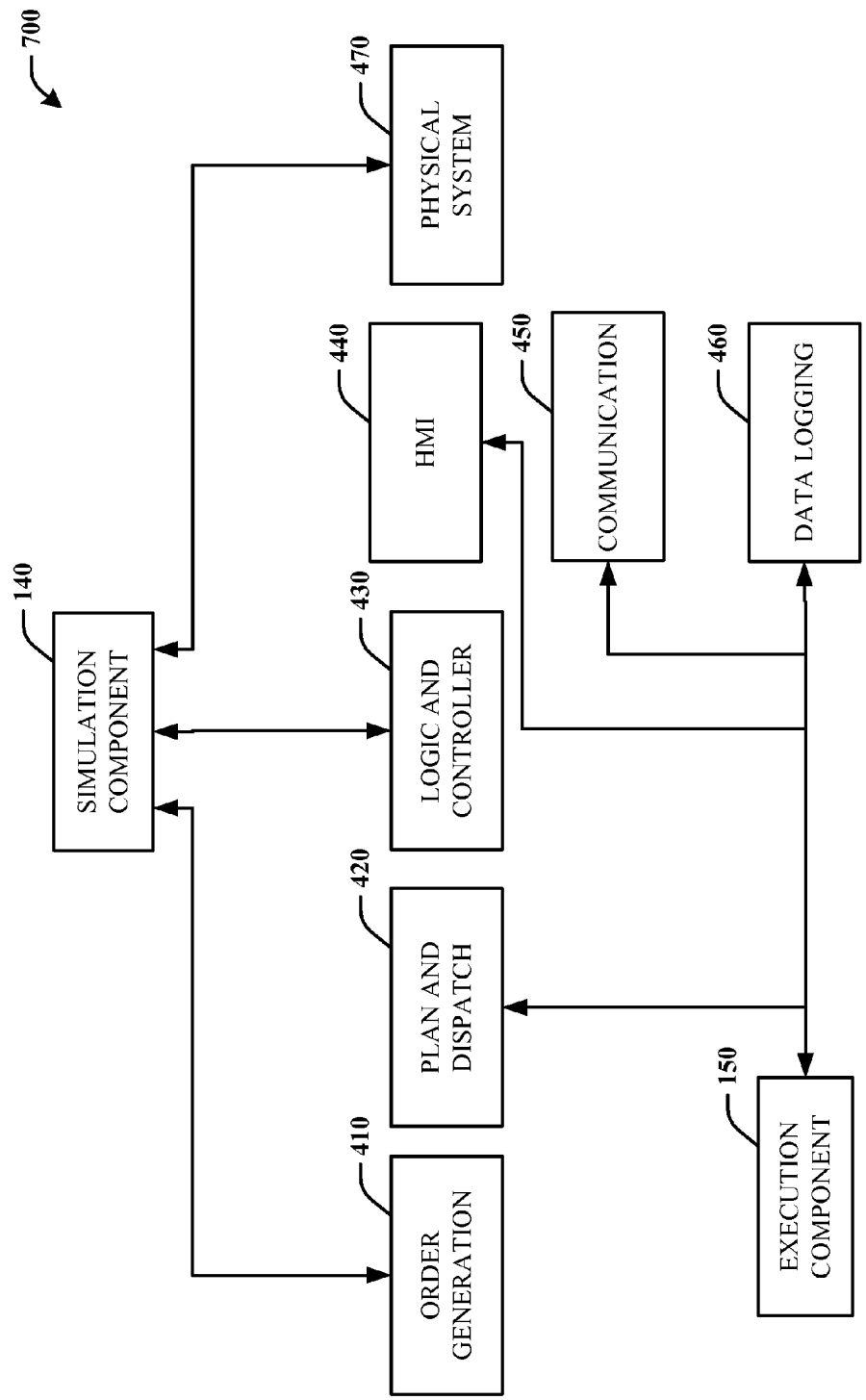
FIG. 7 is another block diagram of a simulation system for testing.

FIG. 7 illustrates another block diagram of a simulation system 700 for testing the plan and dispatch process 420. Such configuration directs the simulation component 140 to represent the processes involving order generation 410, logic and controller 430, and the physical system 470, while the execution component 150 executes the remaining processes 420, 440, 450, and 460. Accordingly, a simulation system can be configured to simulate any components to various degrees in any specialized setup of mixing and matching of simulated processes.

Figure 8:
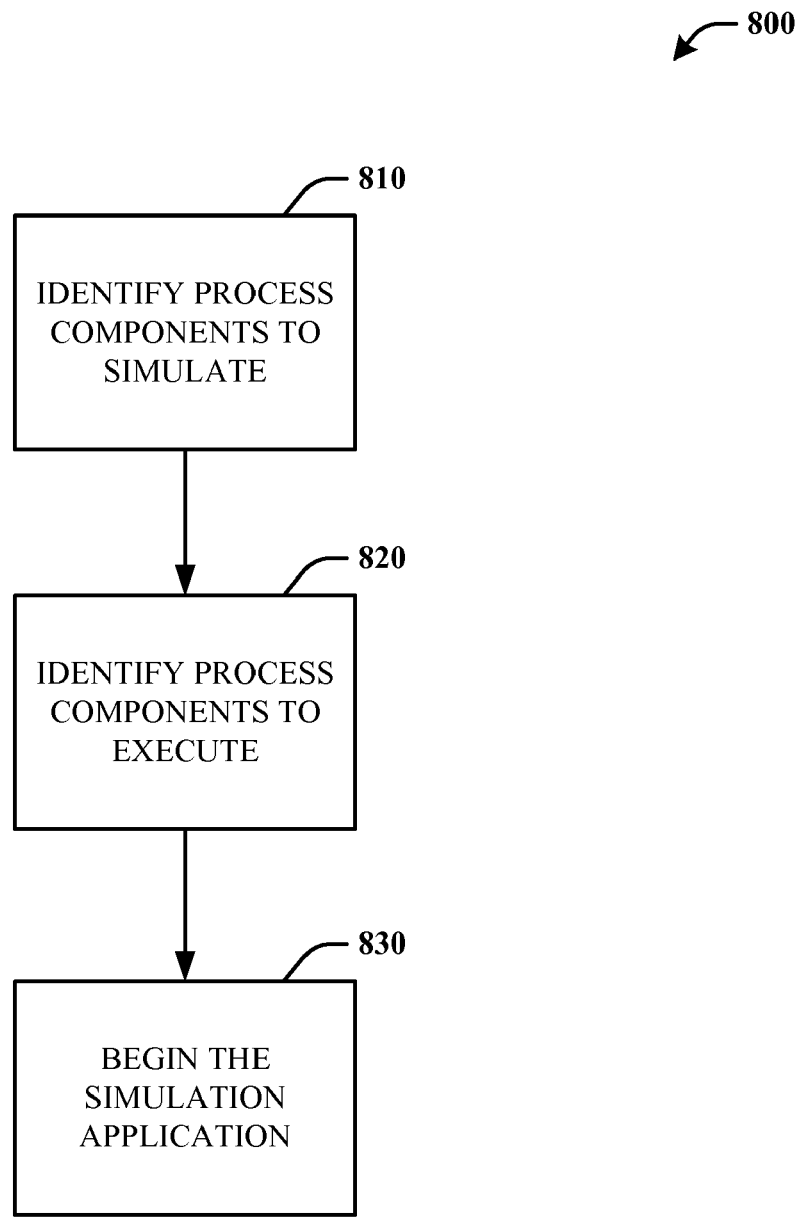
FIG. 8 is a representative flow diagram illustrating a method for facilitating simulation.
Figure 9:
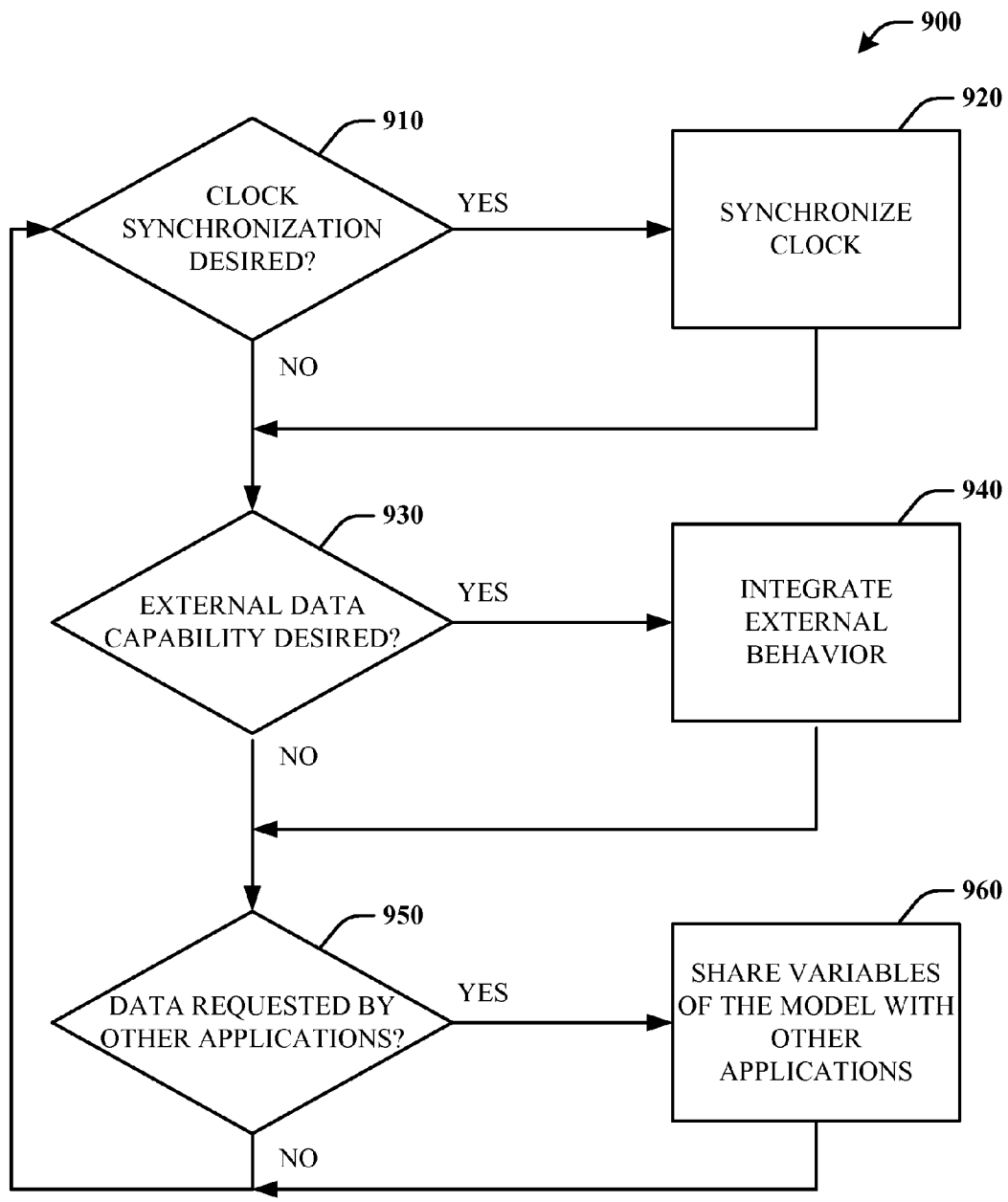
FIG. 9 is a representative flow diagram illustrating a method for configuring a simulation component.
Figure 10:
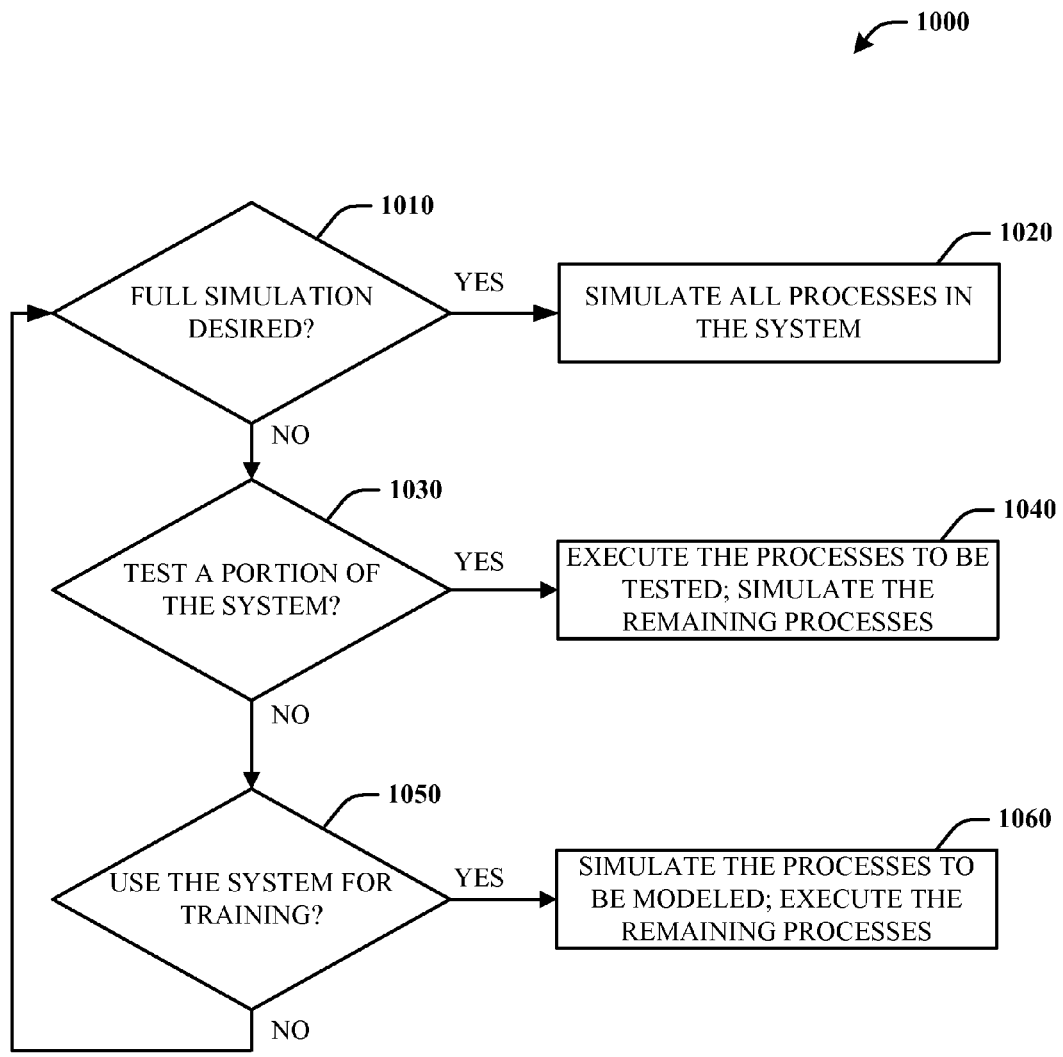
FIG. 10 is another representative flow diagram illustrating a method for facilitating simulation.

In view of the example systems shown and described above, methodologies that may be implemented in accordance with the embodiments will be better appreciated with reference to the flow charts of FIGS. 8-10. While, for purposes of simplicity of explanation, the methodologies are shown and described as a series of acts, it is to be understood and appreciated that the methodologies are not limited by the order of the acts, as some acts may occur in different orders and/or concurrently with other acts from that shown and described herein. Moreover, not all illustrated acts may be required to implement the methodologies described herein.

The methodologies may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired.

Referring specifically to FIG. 8, a method 800 for facilitating simulation is illustrated. More specifically, the method 800 describes the overall organizational process in which a simulation model is established. The method 800 starts by identifying one or more process components to simulate at 810. Once the simulation components are selected, the remaining components are identified to be executed at 820. A user has flexibility to select which processes he wants to simulate, and which processes he wants to execute, depending on the goal of the simulation exercise. The system can be configured for test, design, evaluation, adjustment, certification, and training purposes. Once the simulation and execution processes are designated, at 830, the simulation application begins.

FIG. 9 is a flow diagram of a method 900 for configuring a simulation component. The resulting functions can occur before, during, and/or after simulation. The method 900 begins at 910, by determining whether clock synchronization is desired. If so, the synchronization component synchronizes the clock at 920. The simulation clock may be synchronized to a computer clock, or another external customized timekeeper.

After the clock is synchronized (and also if clock synchronization is not desired), the simulation component establishes whether integration of external behavior into simulation logic is desired at 930. This feature enables messages to be sent and received among processes regarding action requests and status changes. If this communication is desired, at 940, the external behavior is integrated into simulation logic. If this communication is not desired, the method 900 proceeds.

The simulation component contains a convenient mechanism to share data with external applications. The simulation component can send any or all variables gathered before, during, and after simulation to another product, such as an OPC application. This information can be used to compare, duplicate, analyze, and adjust that model. The data can be manually extracted from the simulation component or automatically fed to the external application. At 950, the simulation component establishes whether any data is requested by other applications. If so, at 960, the simulation component shares the applicable variables and/or results from the model with the other applications.

FIG. 10 refers to a flow diagram of a method 1000 of facilitating simulation. In particular, the method 1000 outlines the guidelines used to decide which processes are simulated and which processes are controlled. In this example, there are three general simulation scenarios to choose from: a full simulation, a simulation for testing, and a simulation for training. Although these situations illustrate sample goals of the simulation model, particular details may differ.

At 1010, if a full simulation is desired, then the simulation component will simulate all processes in the system at 1020. At 1030, if a particular aspect is to be tested, verified, or improved upon, then, at 1040, those processes are to be executed while the remaining processes are simulated.

Proceeding to 1050, if a training situation is desired, then the selected processes are simulated and the remaining processes are executed by the trainee at 1060.

Figure 11:
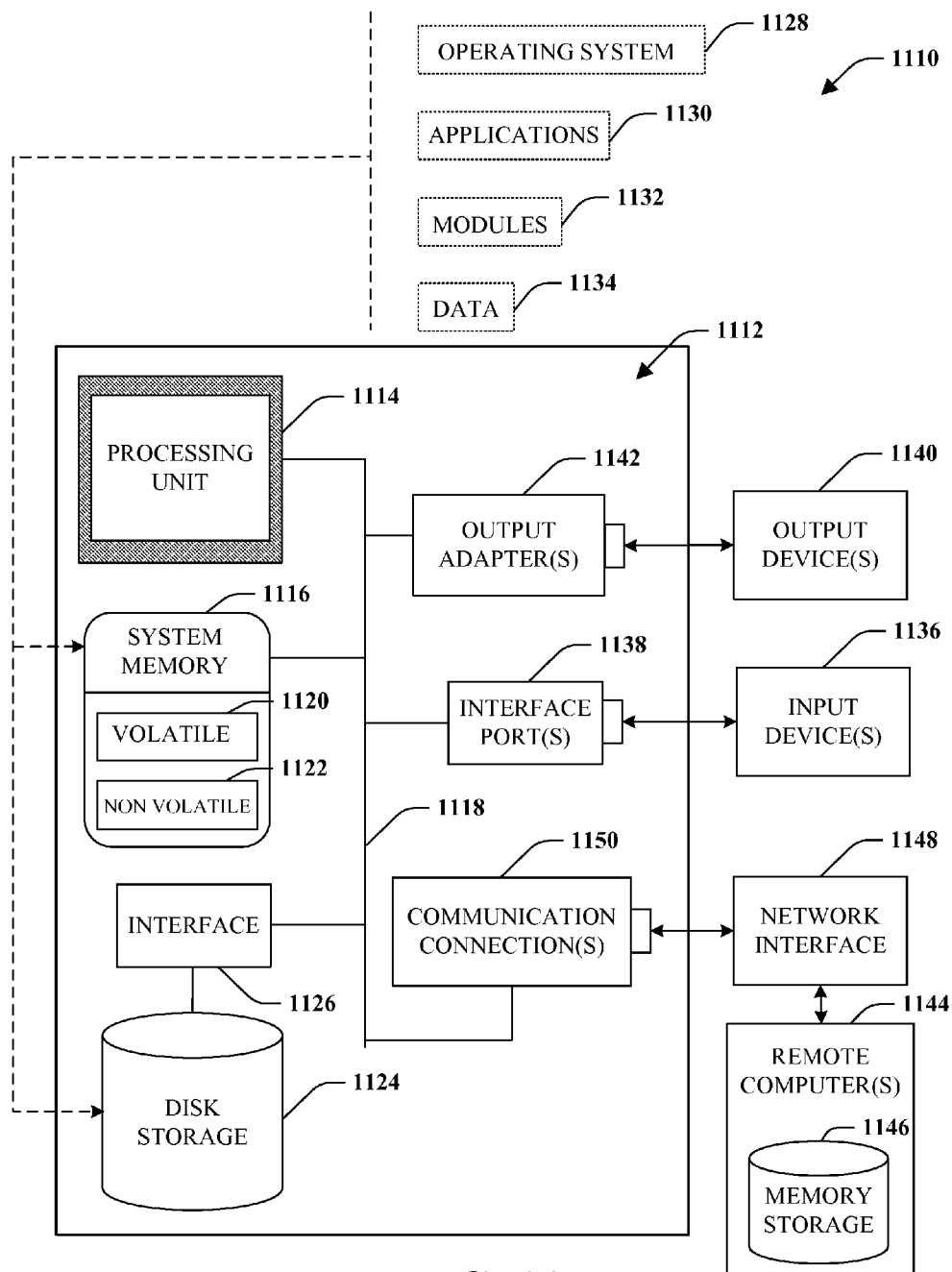
FIG. 11 is a schematic block diagram illustrating a suitable operating environment.
Figure 12:
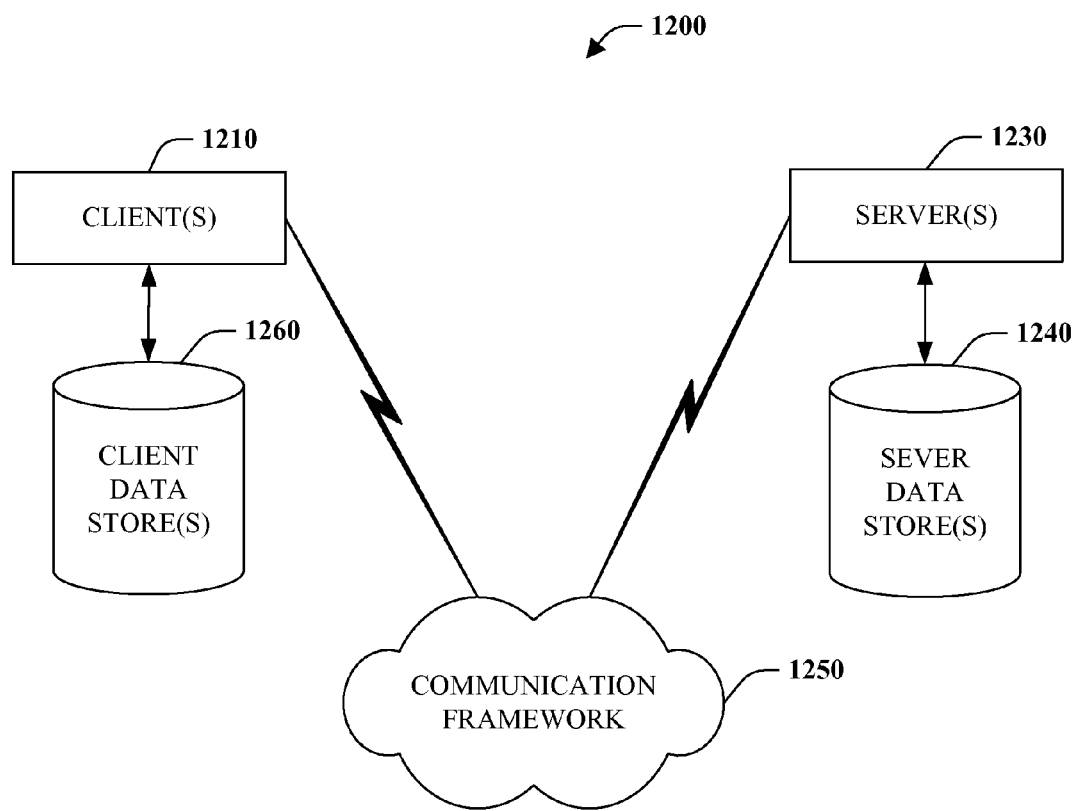
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the claimed subject matter has been described above in the general context of computer-executable instructions of a computer program that runs on a computer and/or computers, it can be recognized that the claimed subject matter also may be implemented in combination with other program modules. Generally, program modules include routines, programs, components, data structures, etc. that perform particular tasks and/or implement particular abstract data types. Moreover, it can be appreciated that the inventive methods may be practiced with other computer system configurations, including single-processor or multiprocessor computer systems, minicomputing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects can be practiced on stand-alone computers. In a distributed computing environment, program modules may be located in both local and remote memory storage devices.

With reference to FIG. 11, an example environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116, and a system bus 1118. The system bus 1118 couples system components including, but not limited to, the system memory 1116 to the processing unit 1114. The processing unit 1114 can be any of various available microprocessors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like displays (e.g., flat panel and CRT), speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection(s) 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 902.3, Token Ring/IEEE 902.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems, power modems and DSL modems, ISDN adapters, and Ethernet cards or components.

FIG. 12 is a schematic block diagram of a sample-computing environment 1200 with which the present invention can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the present invention, for example. One possible communication between a client 1210 and a server 1230 may be in the form of a data packet adapted to be transmitted between two or more computer processes. The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

It is to be appreciated that the systems and/or methods described herein can be facilitated with computer components and non-computer related components alike. Further, it can be ascertained that the systems and/or methods described above are employable in a vast array of electronic related technologies, including, but not limited to, computers, servers, and/or handheld electronic devices, and the like.

What has been described above includes examples of the claimed subject matter. It is, of course, not possible to describe every conceivable combination of components or methodologies for purposes of describing such subject matter, but it can be recognized that many further combinations and permutations of the embodiments are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates simulation, comprising:
   a processor;
   a memory communicatively coupled to the processor, the memory having stored therein computer-executable instructions to implement the system, comprising:
   an external integration component configured to automatically receive data from one or more external applications and provide the received data to a simulation component, the received data describes monitored behavior of a manufacturing production system during execution;
   the simulation component configured to employ the received data to simulates at least one process component of a plurality of process components, the plurality of process components control the manufacturing production system; and
   a data share component configured to automatically share data from the simulation component with the one or more external applications to enable to the one or more external application to adjust at least one parameter of one or more of the plurality of process components to implement an improvement to the execution of the manufacturing production system, the shared data comprises at least one result produced from the simulated at least one process component.

2. The system of claim 1, wherein at least one non process component that is simulated interacts with at least one process component that is not simulated.

3. The system of claim 1, the simulation component comprises:
a synchronization component configured to synchronize a clock of the simulation component with another clock.

4. The system of claim 1, the one or more external applications probes the simulation component for the extracted data.

5. The system of claim 1, the simulation component configured to automatically feed the extracted data to the one or more external applications.

6. The system of claim 3, the simulation component configured to simulate the at least one process component based on the synchronized clock.

7. The system of claim 1, the shared data is in a format that is mutually readable by the simulation component and the one or more external applications.

8. A method that facilitates simulation, comprising the following acts:
receiving data from one or more external applications, the received data describes monitored behavior of a manufacturing production system during execution;
simulating at least one process component of a plurality of process components, the plurality of process components control the manufacturing production system, wherein the simulating employs the received data; and
analyzing a result of the simulating;
identifying data comprising one or more parameters of the plurality of process components that need to be adjusted based on the analyzed results of the simulation; and
sending the data to the one or more external applications wherein a data share component is configured to automatically share data from a simulation component with the one or more external applications to enable the one or more external application to adjust at least one parameter of one or more of the plurality of process components to implement an improvement to the execution of the manufacturing production system, the shared data comprises at least one result produced from the simulating of at least one process component.

9. The method of claim 8, further comprising:
adjusting the one or more parameters.

10. The method of claim 9, further comprising repeating the simulating to verify that the adjusting the one or more parameters was appropriate.

11. The method of claim 8, wherein sending the data occurs automatically at least one of during or after the simulating.

12. The method of claim 8, wherein sending the data is in response to a request from the one or more external applications.

13. The method of claim 8, further comprising:
extracting data from the simulating; and
transmitting the extracted data to the one or more external applications.

14. The method of claim 8, wherein sending the data comprises sending the data in a format that is mutually readable by a component performing the simulation and the one or more external applications.

15. The method of claim 9, further comprising identifying via the extracted data at least one of a bottleneck or a problem with an assembly process of the manufacturing production system.

16. A system that facilitates simulation, comprising:
means for receiving data from one or more external applications, the received data describes monitored behavior of a manufacturing production system during execution;
means for simulating at least one process component of a plurality of process components, the plurality of process components control the manufacturing production system, wherein the simulating employs the received data; and
means for evaluating a result of the simulating;
means for identifying data comprising one or more parameters of the plurality of process components that need to be altered based on the analyzed results of the simulation; and
means for sending the data to the one or more external applications wherein a data share component is configured to automatically share data from a simulation component with the one or more external applications to enable the one or more external application to adjust at least one parameter of one or more of the plurality of process components to implement an improvement to the execution of the manufacturing production system, the shared data comprises at least one result produced from the simulating of at least one process component.

17. The system of claim 16, further comprising:
means for altering the one or more parameters.

18. The system of claim 17, further comprising:
means for repeating the simulation to confirm that the alteration of the one or more parameters was proper.

19. The system of claim 16, wherein sending the data occurs automatically at least one of during or after the simulating.

20. The system of claim 16, wherein sending the data is in response to a request from the one or more external applications.

21. The system of claim 16, further comprising:
means for extracting information from the simulating; and
means for sending the extracted information to the one or more external applications.

22. The system of claim 16, wherein sending the data comprises sending the data in a format that is mutually readable by the means for simulating and the one or more external applications.

23. A non-transitory computer-readable medium having stored thereon computer-executable instructions that when executed by a processor perform the following acts:
receiving-data from one or more external applications, the received data describes monitored behavior of a manufacturing production system during execution;
simulating at least one process component of a plurality of process components, the plurality of process components control the manufacturing production system, wherein the simulating employs the received data;

analyzing a result of the simulating;
identifying data comprising one or more parameters of the plurality of process components that need to be adjusted based on the analyzed results of the simulation; and
sending the data to the one or more external applications wherein a data share component is configured to automatically share data from a simulation component with the one or more external applications to enable the one or more external application to adjust at least one parameter of one or more of the plurality of process components to implement an improvement to the execution of the manufacturing production system, the shared data comprises at least one result produced from the simulating of at least one process component.

* * * * *